United States Patent
Spahn et al.

(10) Patent No.: US 10,399,529 B2
(45) Date of Patent: Sep. 3, 2019

(54) SEAT ASSEMBLY WITH MOVEABLE ARMS WITH AIRBAGS

(71) Applicant: Ford Global Technologies, LLC, Dearborn, MI (US)

(72) Inventors: Brian Spahn, Plymouth, MI (US); Alan Dry, Grosse Pointe Woods, MI (US); Johnathan Line, Northville, MI (US); Daniel Ferretti, Commerce Township, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 82 days.

(21) Appl. No.: 15/713,933

(22) Filed: Sep. 25, 2017

(65) Prior Publication Data

US 2019/0092264 A1    Mar. 28, 2019

(51) Int. Cl.
| | |
|---|---|
| *B60R 21/207* | (2006.01) |
| *B60N 2/14* | (2006.01) |
| *B60R 21/231* | (2011.01) |
| *B60N 2/75* | (2018.01) |
| *B60R 21/02* | (2006.01) |
| *B60R 21/01* | (2006.01) |

(52) U.S. Cl.
CPC .............. *B60R 21/207* (2013.01); *B60N 2/14* (2013.01); *B60N 2/79* (2018.02); *B60R 21/231* (2013.01); *B60N 2/753* (2018.02); *B60R 2021/01245* (2013.01); *B60R 2021/022* (2013.01); *B60R 2021/23107* (2013.01); *B60R 2021/23146* (2013.01)

(58) Field of Classification Search
CPC ........ B60R 21/207; B60R 2021/01245; B60R 2021/022; B60R 2021/23146; B60N 2/753
See application file for complete search history.

(56) References Cited

U.S. PATENT DOCUMENTS

| | | | | |
|---|---|---|---|---|
| 2,861,626 | A | * | 11/1958 | Mills, Jr. ................. B60R 21/02 280/748 |
| 2,873,122 | A | * | 2/1959 | Peras ...................... B60R 21/02 180/271 |
| 3,623,768 | A | | 11/1971 | Capener et al. |
| 3,981,518 | A | | 9/1976 | Pulling |
| 4,568,122 | A | * | 2/1986 | Kain .................... B60N 2/2866 297/216.11 |
| 4,906,047 | A | * | 3/1990 | Mikami ............... B60N 2/4221 297/464 |
| 5,564,736 | A | | 10/1996 | Kim |
| 2018/0281723 | A1 | * | 10/2018 | Nagasawa ............... B60R 21/18 |
| 2018/0281725 | A1 | * | 10/2018 | Nagasawa ............... B60R 21/18 |

FOREIGN PATENT DOCUMENTS

| | | |
|---|---|---|
| DE | 102012221533 A1 | 5/2014 |
| JP | 2008222199 | 9/2008 |
| JP | 5776519 B2 | 9/2015 |

* cited by examiner

*Primary Examiner* — Darlene P Condra
(74) *Attorney, Agent, or Firm* — Frank A. MacKenzie; Bejin Bieneman PLC

(57) ABSTRACT

A vehicle seat assembly includes a seat, two arms coupled to the seat, and an airbag coupled to each arm. Each arm is movable from a stowed position beside the seat to an extended position abutting the other arm. The airbags are inflatable toward the seat when the arms are in the extended position.

20 Claims, 6 Drawing Sheets

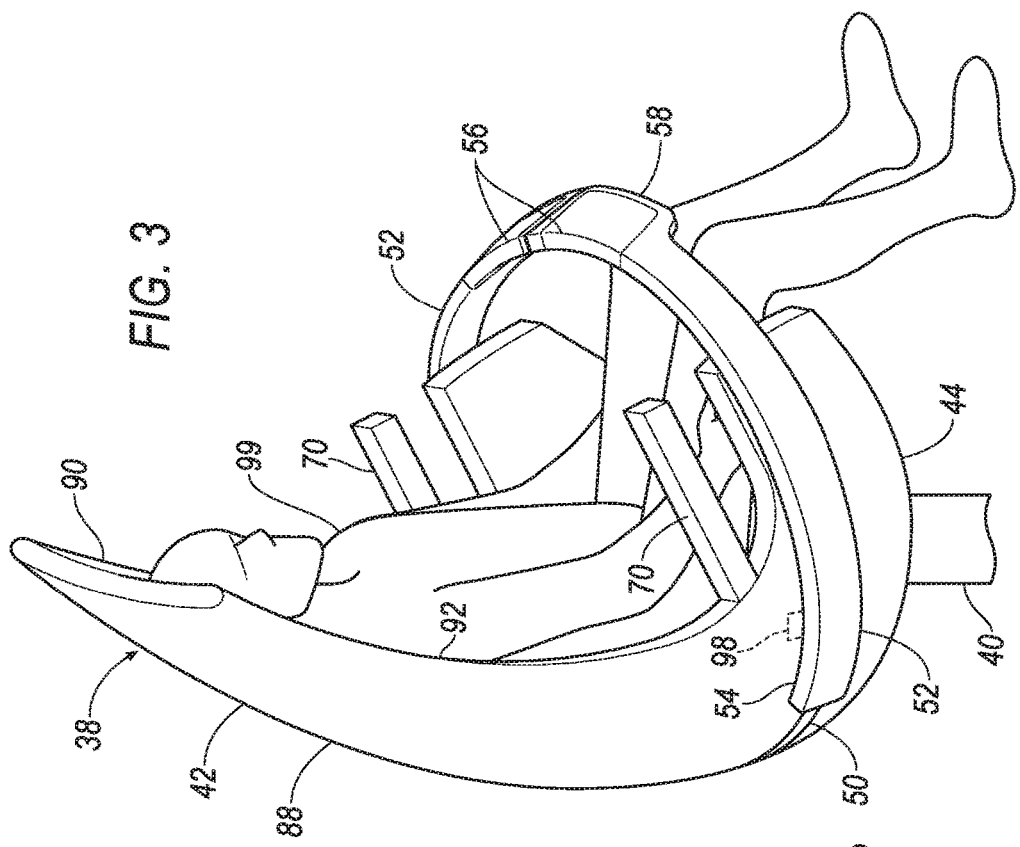
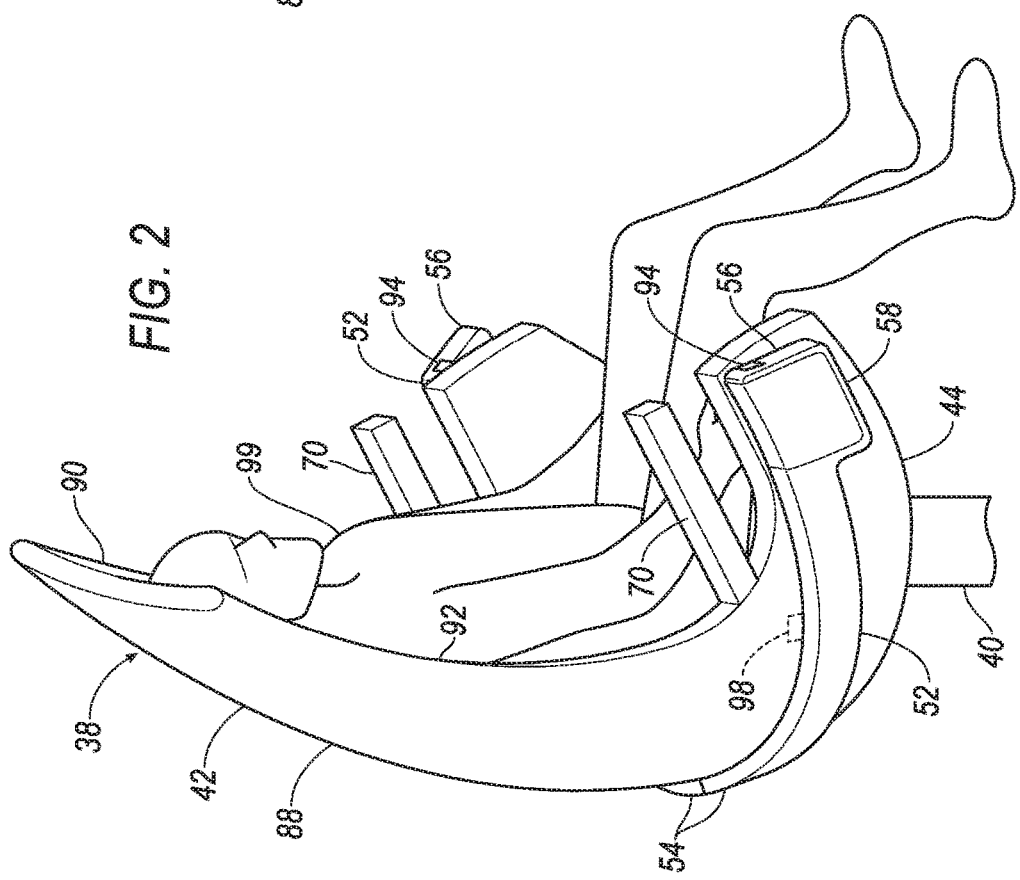

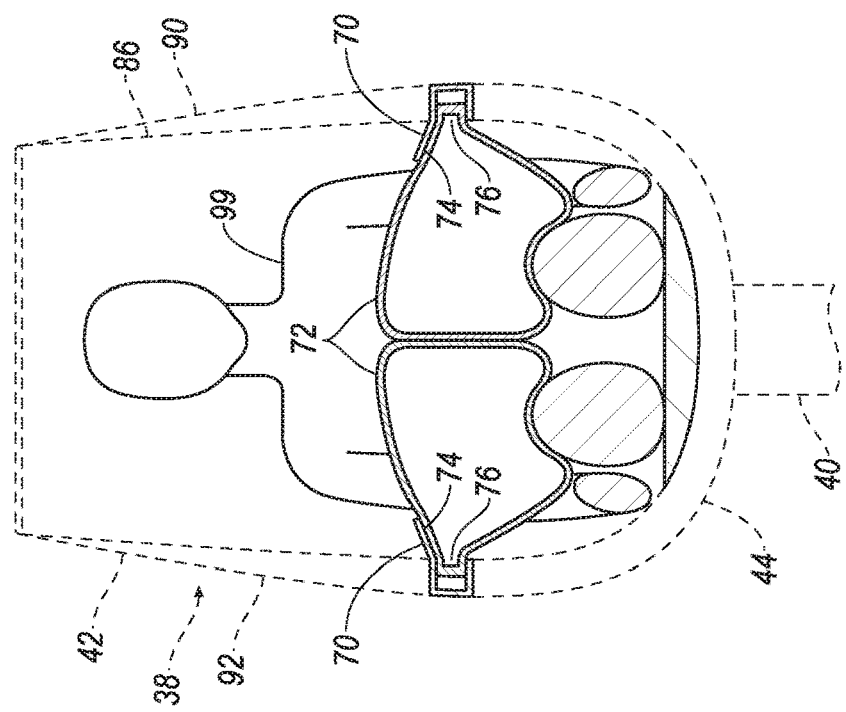
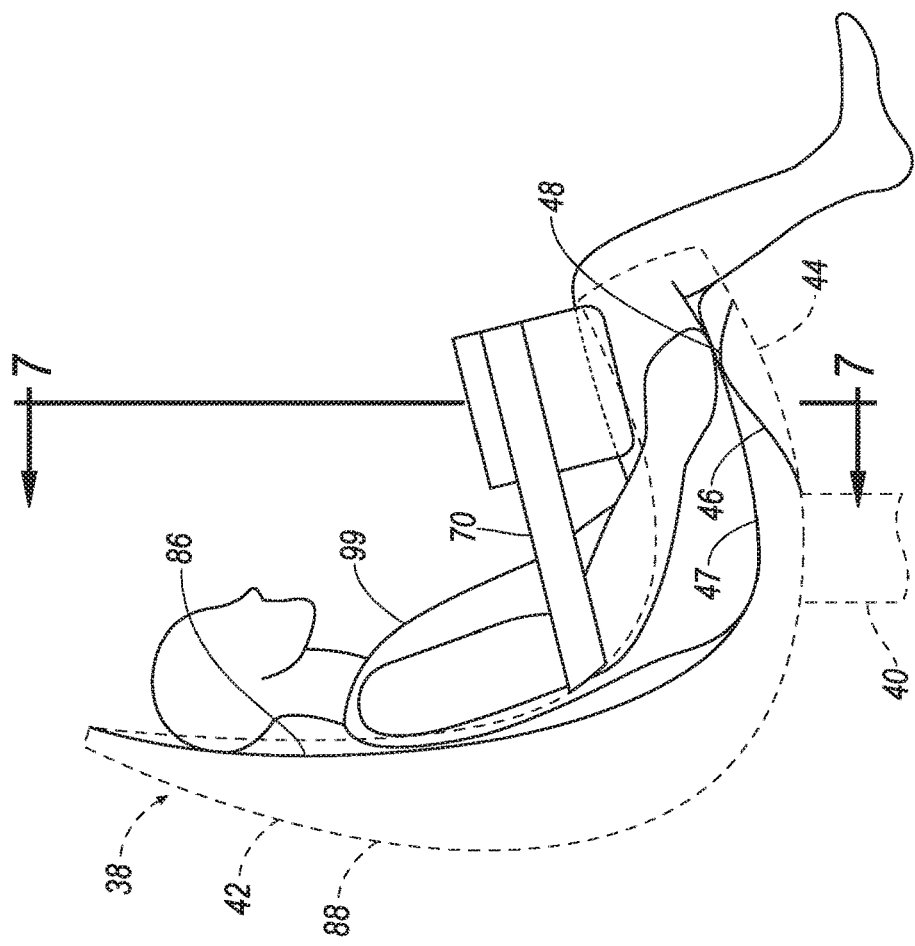
FIG. 7
FIG. 6

SEAT ASSEMBLY WITH MOVEABLE ARMS WITH AIRBAGS

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

BRIEF DESCRIPTION OF THE DRAWINGS

FIG. 2 is a perspective view of a seat in the passenger cabin with arms in a stowed position.

FIG. 3 is a perspective view of the seat with the arms in an extended position.

FIG. 6 is a side view of the seat with the arms omitted for illustration.

FIG. 7 is a cross-sectional front view of the seat.

DETAILED DESCRIPTION

Figure 1:
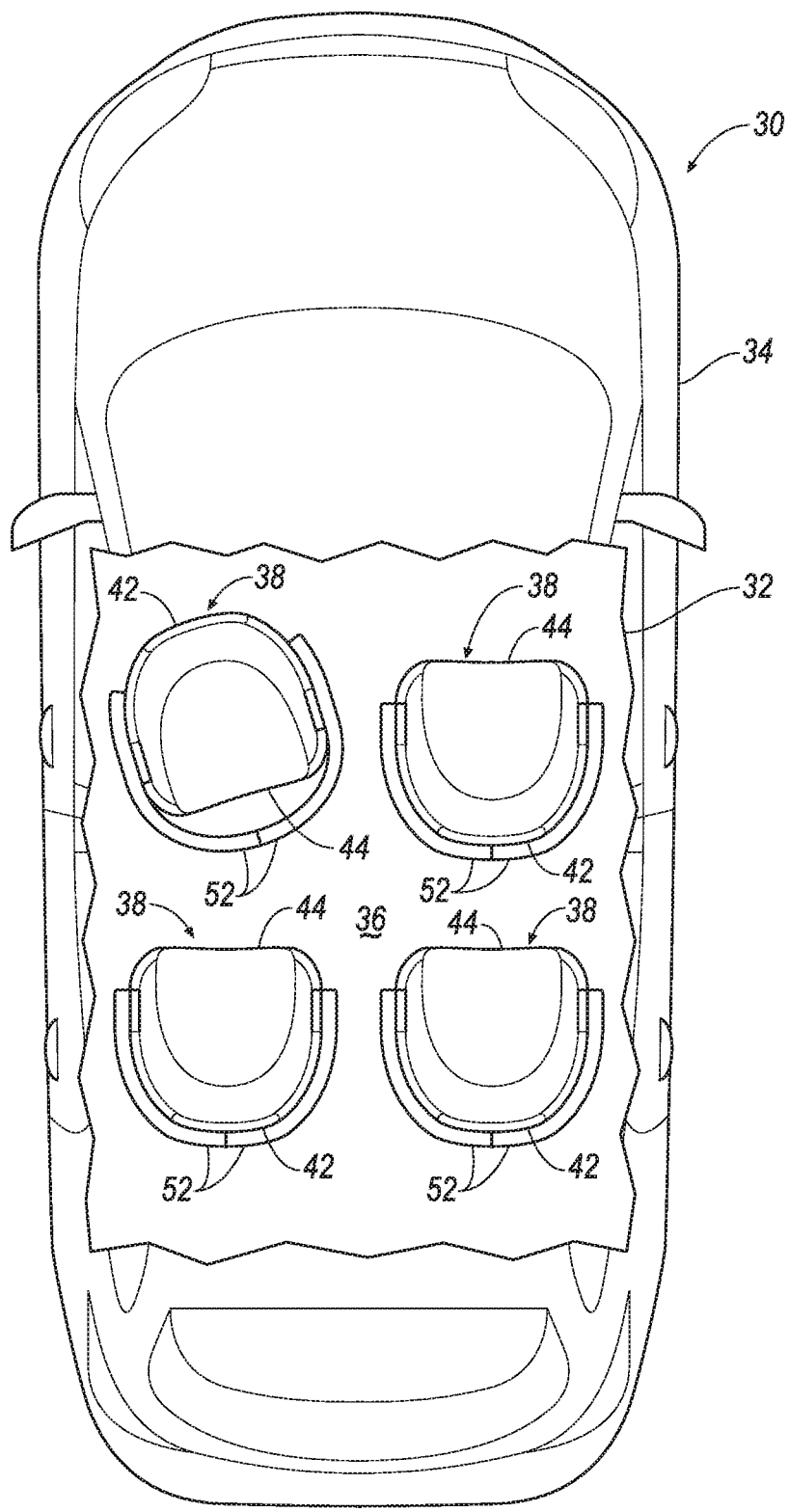
FIG. 1 is top view of a passenger cabin of a vehicle.

A vehicle seat assembly includes a seat, two arms coupled to the seat, and an airbag coupled to each arm. Each arm is movable from a stowed position beside the seat to an extended position abutting the other arm. The airbags are inflatable toward the seat when the arms are in the extended position.

The vehicle seat assembly may include reaction surfaces positioned on the arms to contact a respective one of the airbags when the airbags are in an inflated position, and each of the airbags may be positioned to be between one of the reaction surfaces and the seat when the airbags are in the inflated position.

The vehicle seat assembly may include reaction surfaces deployable relative to the arm from an undeployed position to a deployed position, and the airbags in the inflated position may contact the reaction surfaces in the deployed position. Each reaction surface in the undeployed position covers one of the airbags in an uninflated position. The reaction surfaces may be rotatable relative to the arms between the undeployed position and the deployed position.

The airbags may be first airbags, and the vehicle seat assembly may further include a second airbag coupled to each arm. The seat may include a seat bottom and a seatback, and the first airbags may be inflatable toward the seatback, and the second airbags may be inflatable toward the seat bottom. The vehicle seat assembly may include first reaction surfaces positioned on the arms to contact a respective one of the first airbags in an inflated position and positioned with the first airbag between that first reaction surface and the seatback when the first airbags are in the inflated position, and the vehicle seat assembly may include second reaction surfaces positioned on the arms to contact a respective one of the second airbags in an inflated position and positioned with the second airbags between the second reaction surface and the seat bottom when the second airbags are in the inflated position. The first airbags may expand upward relative to the seat when inflating.

The arms may be slidable relative to the seat between the stowed position and the extended position. The arms may be curvedly elongated and slidable along a curved path between the stowed position and the extended position.

The vehicle seat assembly may include two armrests spaced from the arms. The airbags may be first airbags, and the vehicle seat assembly may further include a second airbag coupled to each armrest. The vehicle seat assembly may include reaction surfaces positioned on the armrests above one of the second airbags relative to the seat, and the reaction surfaces may be positioned to contact the second airbags in an inflated position. The reaction surfaces may be first reaction surfaces, and the vehicle seat assembly may include second reaction surfaces with the second airbags between the second reaction surface and the seat, the second reaction surfaces positioned to contact the second airbags in the inflated position. The second airbags may abut each other when inflated.

The arms may be latchable to each other in the extended position.

A vehicle seat assembly includes a seat, two armrests coupled to opposing sides of the seat, and airbags coupled to the armrests. The airbags abutting each other when inflated.

The vehicle seat assembly may include a reaction surface positioned above each of the airbags relative to the seat, and the reaction surfaces may be positioned to contact the airbags in the inflated position. The reaction surfaces may be first reaction surfaces, and the vehicle seat assembly may include second reaction surfaces positioned with the airbags between the second reaction surface and the seat, and the second reaction surfaces may be positioned to contact the airbags in the inflated position.

A seat 38 with attached components as described herein provides the benefits of airbag protection regardless of the orientation of the seat 38 in a vehicle 30. In the event of an impact, airbags 60, 62, 72 can deploy and may prevent a secondary impact between an occupant 99 sitting in the seat 38 and a component of a passenger cabin 32 of the vehicle 30, such as a dashboard, window, or pillar. Moreover, also in the event of an impact, the airbags 60, 62, 72 may prevent or decrease the severity of loose objects in the passenger cabin 32 striking the occupant 99. The airbags 60, 62, 72 may reduce the likelihood that the occupant 99 "submarines" during an impact, i.e., slides forward along a seat bottom 44 out of position; specifically, the airbags 62 may prevent shins of the occupant 99 from sliding forward, and the airbags 60, 72 may press the occupant 99 downward against an anti-submarining ramp 46. The seat 38 having the airbags 60, 62, 72 may thus reduce injuries to the occupant 99 during an impact. At the same time, the seat 38 allows the occupant greater freedom of movement by possibly replacing seatbelts. Arms 52 holding the airbags 60, 62 are spaced from the occupant 99 and may be manually moved into position or may be deployed into position in the event of an impact.

With reference to FIG. 1, the vehicle 30 may be an autonomous vehicle. A computer (not shown) can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes the passenger cabin 32. The passenger cabin 32 houses occupants 99, if any, of the vehicle 30. The passenger cabin 32 may be surrounded and/or defined by a body 34 of the vehicle 30. A floor 36 may define a bottom of the passenger cabin 32. The passenger cabin 32 includes one or more seats 38 for occupants 99 of the vehicle 30 disposed on the floor 36 and coupled to the floor 36.

With reference to FIGS. 1-4 and 6-7, the seats 38 may be bucket seats, as shown in the Figures, bench seats, or another type of seat. Each seat 38 defines a front direction as a direction faced by an occupant 99 sitting in the seat 38. The seats 38 may be rotatably coupled to the floor 36 via, e.g., a pedestal 40. The seats 38 may each be rotatable about a vertical axis relative to the passenger cabin 32. Each seat 38 may face a vehicle-forward direction, a vehicle-rearward direction, or any direction in between. Whichever direction the seat 38 is facing is the forward direction relative to the seat 38.

The seat 38 may include a seatback 42 and the seat bottom 44 coupled to the seatback 42. The seatback 42 may be supported by the seat bottom 44 and may be stationary or movable relative to the seat bottom 44. The seatback 42 and/or the seat bottom 44 may be adjustable in multiple degrees of freedom. Specifically, the seatback 42 and/or the seat bottom 44 may themselves be adjustable, in other words, have adjustable components within the seatback 42 and/or the seat bottom 44, and/or may be adjustable relative to each other. The seatback 42 includes a front side 86 that the occupant 99 contacts when sitting in the seat 38, a back side 88 facing the opposite direction as the front side 86, and a left side 90 and a right side 92 facing laterally and connecting the front side and the back side.

With reference to FIG. 6, the seat bottom 44 may include an anti-submarining ramp 46 and a cushion 47. The cushion 47 may cover the anti-submarining ramp 46. The anti-submarining ramp 46 may be stiffer, i.e., require a greater force to compress, than the cushion 47. The anti-submarining ramp 46 may slope upward in a seat-forward direction. The anti-submarining ramp 46 may include a crest 48 at a maximum height of the anti-submarining ramp 46, and the crest 48 may be disposed more than halfway forward relative to the seat bottom 44. The crest 48 of the anti-submarining ramp 46 may be positioned below thighs and forward of hips of the occupant 99 who is 50th percentile in height. The anti-submarining ramp 46 may be positioned to reduce a likelihood that the occupant 99 "submarines," i.e., slides below restraints during an impact.

Figure 4:
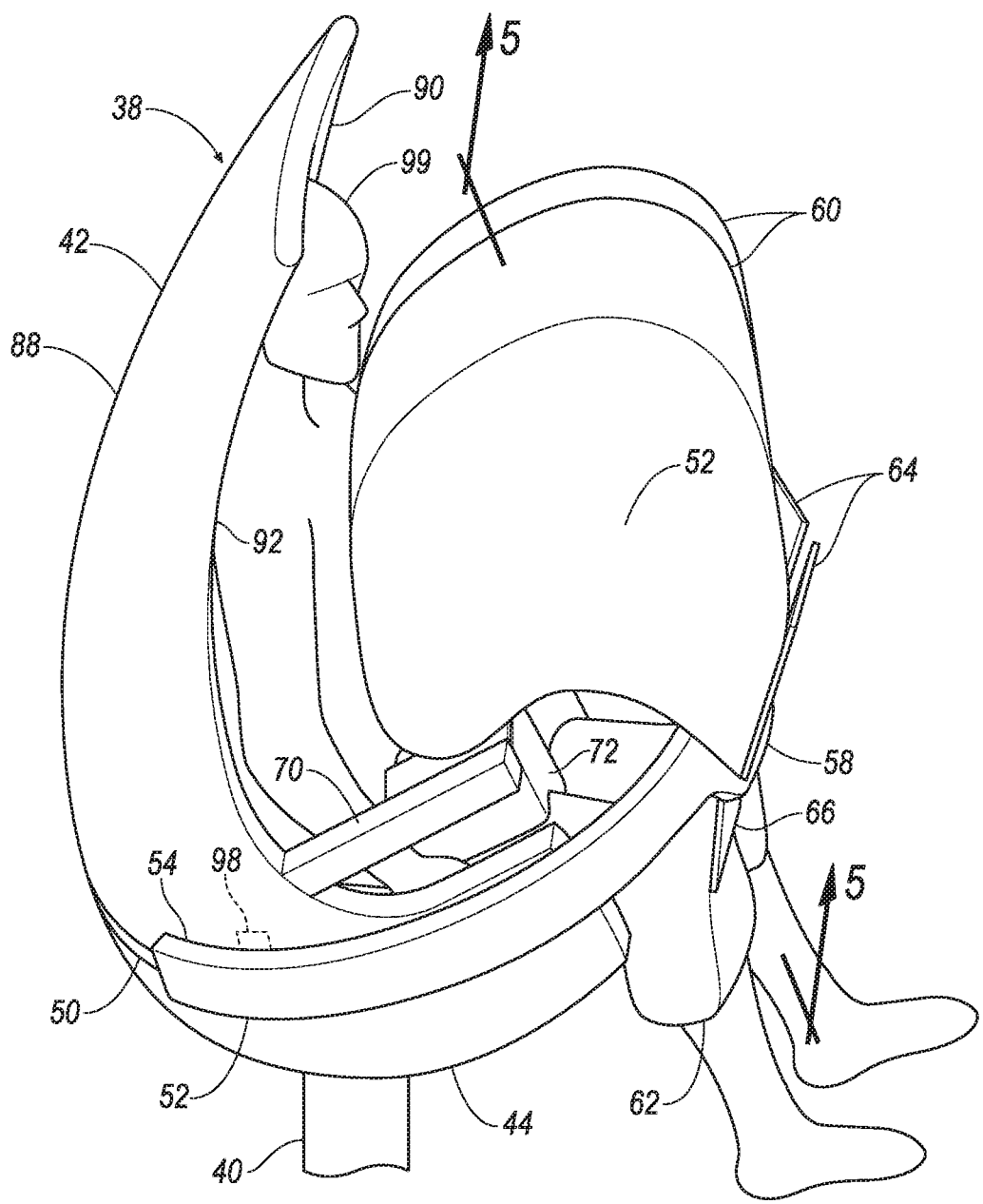
FIG. 4 is a perspective view of the seat with the arms in the extended position and airbags in an inflated position.

With reference to FIGS. 3 and 4, one or more tracks 50 are fixed to the seats 38, e.g., the seatback 42. In such an example, the tracks 50 and the seatback 42 move together as a unit. The tracks 50 are elongated generally laterally along a back side of the seatback 42. The track 50 may have a constant cross-section along the length. The track 50 may be curved and may be elongated along a partial-circular path. The track 50 may extend from the left side 90 of the seatback 42 along the back side 88 of the seatback 42 to the right side 92 of the seatback 42, or two tracks 50 may each extend from the left side 90 or the right side 92 of the seatback 42 to the back side 88 of the seatback 42 without meeting.

With reference to FIGS. 1-4 and 6-7, two arms 52 are coupled to the seat 38. The arms 52 are slidable relative to the seat 38. The arms 52 are slidably engaged with the tracks 50. The occupant 99 may slide the arms 52 along the track 50. The arms 52 may be curvedly elongated, e.g., in a partial-circular shape, and the curvature of the arms 52 may mate with the curvature of the track 50. The friction between the arms 52 and the track 50 may be high enough that movement of the vehicle 30 does not cause the arms 52 to slide and low enough that an occupant 99 is capable of sliding the arms 52 to a desired position.

Each arm 52 is movable from a stowed position beside the seat 38 to an extended position abutting the other arm 52 in the extended position. The arms 52 may be slidable relative to the seat 38 between the stowed position and the extended position. Specifically, the arms 52 may be slidable along the curved path tracking the track 50 between the stowed position and the extended position. When both arms 52 are in the extended position, the arms 52 abut each other in front of the seatback 42 and in front of the occupant 99. In other words, when both arms 52 are in the extended position, the arms 52 and the seatback 42 completely surround an occupant seating area, and extend entirely around the occupant 99 seated in the seat 38. When both arms 52 are in the stowed position, the arms 52 are disposed beside and behind the seatback 42, i.e., along the left and right sides 90, 92 and the back side 88, and permit the occupant 99 to sit down and get up from the seat 38.

The arms 52 may be manually movable between the stowed position and the extended position, i.e., movable by the occupant 99. For example, the friction between the arms 52 and the track 50 may allow the occupant 99 to be able to easily slide the arms 52 along the track 50. Alternatively or additionally, a motor 98 may be engaged with and move the arms 52 along the track 50.

The arms 52 are each elongated from a rear end 54 to a forward end 56. In the stowed position, the rear ends 54 are closer to each other than in the extended position. For example, the rear ends may abut each other in the stowed position. In the extended position, the forward ends 56 abut each other. The arms 52, specifically, the forward ends 56, may be latchable to each other in the extended position. For the purposes of this disclosure, "latchable" means releasably mechanically engaged. Specifically, the forward ends 56 may include a latch 94. For example, one forward end 56 may include a strike, and the other forward end 56 may include a catch releasably engageable with the catch. The latch 94 may be releasable by operation of a release button (not shown).

The arms 52 each include an airbag portion 58. The airbag portions 58 are disposed at the forward ends 56 and may include the forward ends 56. The airbag portions 58 may have a larger cross-sectional area than the rest of the arms 52.

Figure 5:
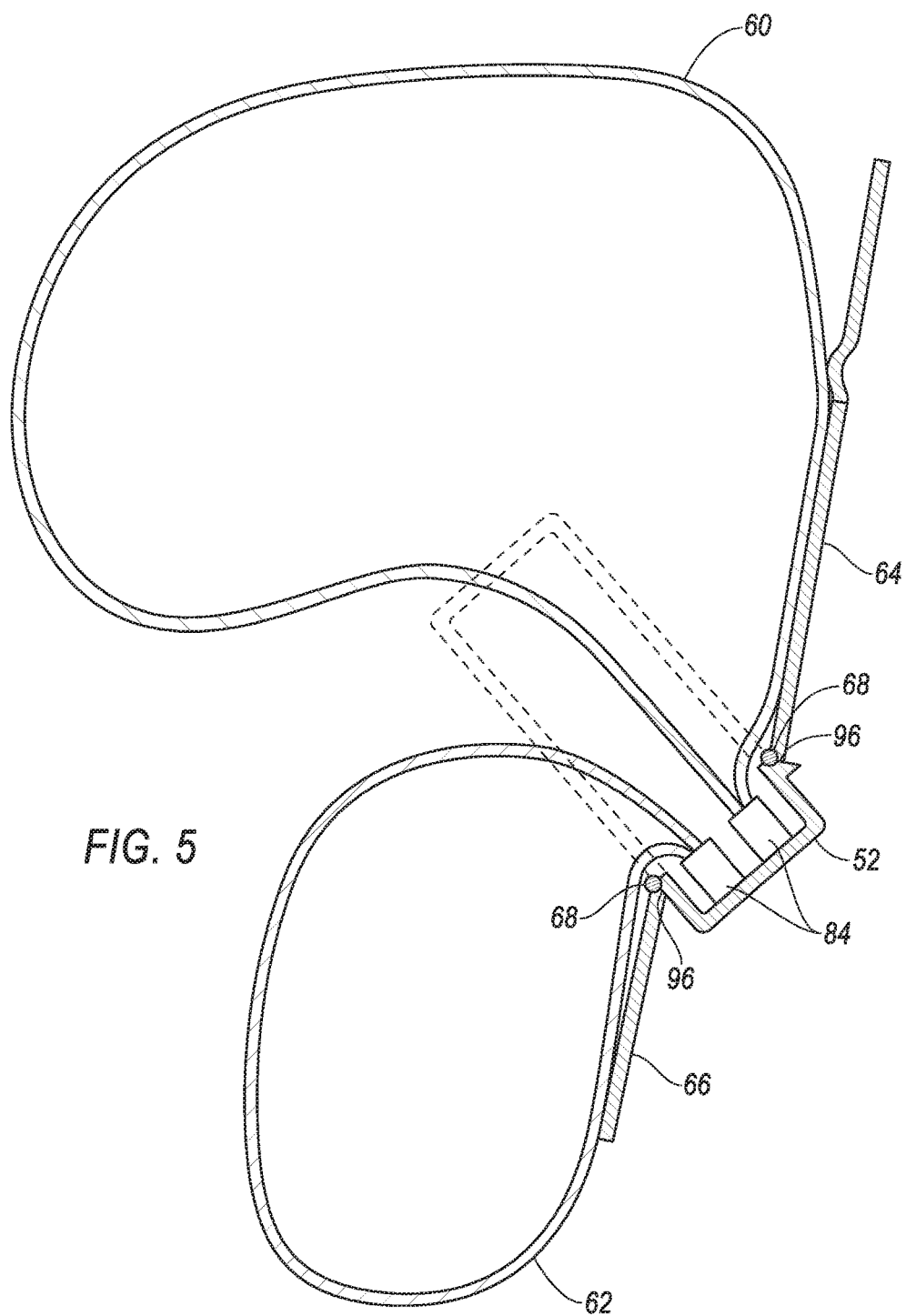
FIG. 5 is a cross-sectional side view of one of the arms and the corresponding airbags.

With reference to FIGS. 2-5, an upper airbag 60 is coupled to each arm 52 and is inflatable from an uninflated position, as shown in FIGS. 2 and 3, to an inflated position, as shown in FIGS. 4 and 5. In the uninflated position, the upper airbags 60 are disposed in the arms 52 closer to the forward ends 56 than to the rear ends 54. The upper airbags 60 may be adjacent to the forward ends 56; i.e., nothing is between the upper airbags 60 and the forward ends 56. The upper airbags 60 in the uninflated position may be disposed in the airbag portions 58. The upper airbags 60 are inflatable toward the seat 38 when the arms 52 are in the extended position. The upper airbags 60 expand toward the seatback 42 and upward relative to the seat 38 when inflating from the uninflated position to the inflated position. The upper airbags 60 may be sized and positioned to contact a head of the occupant 99 sitting in the seat 38 who is 50th percentile in height.

A knee airbag 62 is coupled to each arm 52 and is inflatable from an uninflated position, as shown in FIGS. 2 and 3, to an inflated position, as shown in FIGS. 4 and 5. In the uninflated position, the knee airbags 62 are disposed in the arms 52 closer to the forward ends 56 than to the rear ends 54. The knee airbags 62 may be adjacent to the forward ends 56; i.e., nothing is between the knee airbags 62 and the forward ends 56. The knee airbags 62 in the uninflated position may be disposed in the airbag portions 58 below the upper airbags 60. The knee airbags 62 are inflatable toward the seat 38 when the arms 52 are in the extended position. The knee airbags 62 expand toward the seat bottom 44 when inflating from the uninflated position to the inflated position. The knee airbags 62 may be sized and positioned to contact the knees of the occupant 99 sitting in the seat 38 who is 50th percentile in height. The knee airbags 62 may block forward movement of shins of the occupant 99, assisting the anti-submarining ramp 46.

Reaction surfaces 64, 66 are supported by and coupled to the arms 52. The reaction surfaces 64, 66 may be panels, i.e., may be planar. The reaction surfaces 64, 66 may be movably connected to the arms 52, e.g., may be rotationally engaged with the arms 52, e.g., via a piano hinge, living hinge, etc. The reaction surfaces 64, 66 may be rotatable between an undeployed position and a deployed position. The reaction surfaces 64, 66 are stopped from rotating beyond the deployed position. In the deployed position, the reaction surfaces 64, 66 are positioned to direction inflation of the airbags 60, 62 and to resist displacement of the airbags 60, 62 when the occupant 99 pushes into the airbags 60, 62 during an impact.

Each arm 52 supports an upper reaction surface 64 movable between an undeployed position, as shown in FIGS. 2 and 3, and a deployed position, as shown in FIGS. 4 and 5. The airbag portions 58 of the arms 52 may support the upper reaction surfaces 64, and the upper reaction surfaces 64 may be disposed on a forward and upward side of the airbag portions 58. The upper reaction surfaces 64 may be rotatable relative to one of the arms 52 between the undeployed position and the deployed position. Each upper reaction surface 64 is positioned so that one of the upper airbags 60 contacts the upper reaction surface 64 when inflating and inflates between that upper reaction surface 64 and the seat 38, specifically, the seatback 42. Each upper reaction surface 64 in the undeployed position covers one of the upper airbags 60 in the uninflated position. Each upper airbag 60 in the inflated position contacts one of the upper reaction surfaces 64 in the deployed position and is disposed between that upper reaction surface 64 and the seat 38. When the occupant 99 presses against the upper airbags 60 during an impact, the upper reaction surfaces 64 resist the motion of the upper airbags 60, thus resisting the momentum of the occupant 99.

Each arm 52 supports a knee reaction surface 66 movable between an undeployed position, as shown in FIGS. 2 and 3, and a deployed position, as shown in FIGS. 4 and 5. The airbag portions 58 of the arms 52 may support the knee reaction surfaces 66, and the knee reaction surfaces 66 may be disposed on a rearward and bottom side of the airbag portions 58. The knee reaction surfaces 66 may be rotatable relative to one of the arms 52 between the undeployed position and the deployed position. Each knee reaction surface 66 is positioned so that one of the knee airbags 62 contacts the knee reaction surface 66 when inflating and inflates between that knee reaction surface 66 and the seat 38, specifically, the seat bottom 44. Each knee reaction surface 66 in the undeployed position covers one of the knee airbags 62 in the uninflated position. Each knee airbag 62 in the inflated position contacts one of the knee reaction surfaces 66 in the deployed position and is disposed between that knee reaction surface 66 and the seat 38. When the occupant 99 presses against the knee airbags 62 during an impact, the knee reaction surfaces 66 resist the motion of the knee airbags 62, thus resisting the momentum of the occupant 99.

With reference to FIG. 5, the upper and knee reaction surfaces 64, 66 are rotatably coupled to the arms 52 via hinges 68. Each hinge 68 may have a first hinge portion fixed relative to one of the arms 52, a second hinge portion fixed relative to one of the upper and knee reaction surfaces, and a pin connecting the first hinge portion and the second hinge portion. The pin may allow rotational motion of the second hinge portion relative to the first hinge portion. The hinges 68 permit rotation of the upper and knee reaction surfaces 64, 66 along a range of motion between the undeployed position and deployed position. A stop 96 may block rotation about the hinges 68 of the upper and knee reaction surfaces 64, 66 outside the range of motion, e.g., beyond the deployed position. For example, the stop 96 may be an edge of one of the upper and knee reaction surfaces 64, 66 that contacts an exterior surface of one of the arms 52 when in the deployed position, blocking further rotation, as shown in FIG. 5. For another example, the stop 96 may be a part of the hinges 68 that is movable within a keyed portion of the hinges 68 that defines the range of motion. For another example, the stop 96 may be an extension or portion of the arms 52 that interferes with rotation of the upper and knee reaction surfaces 64, 66 outside the range of motion.

With reference to FIGS. 2-4 and 6-7, two armrests 70 are coupled to opposing sides of the seat 38. The armrests 70 may be coupled to the left and right sides 90, 92 of the seatback 42. The armrests 70 are spaced from the arms 52, and the armrests 70 may be disposed inboard of the arms 52 relative to the seat 38. The armrests 70 are elongated generally parallel of the seat bottom 44 in a forward direction relative to the seat 38. The armrests 70 may be located below a height of an elbow of the occupant 99 sitting in the seat 38 who is 50th percentile in height.

A thigh airbag is coupled to each armrest 70 and is inflatable from an uninflated position, as shown in FIGS. 2 and 3, to an inflated position, as shown in FIGS. 4, 6, and 7. In the uninflated position, the thigh airbags 72 are disposed in the armrests 70. The thigh airbags 72 expand toward the seat bottom 44 when inflating from the uninflated position to the inflated position. The thigh airbags 72 abut each other when in the inflated position. The thigh airbags 72 may be disposed above the crest 48 of the anti-submarining ramp 46 and may inflate toward the anti-submarining ramp 46. The thigh airbags 72 may be sized and positioned to contact the thighs of the occupant 99 sitting in the seat 38 who is 50th percentile in height.

The upper airbags 60, knee airbags 62, and thigh airbags 72 may be formed of any suitable airbag material, for example, a woven polymer. For example, the upper airbags 60, knee airbags 62, and thigh airbags 72 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 7, each armrest 70 supports thigh reaction surfaces 74, 76; e.g., each armrest 70 may support a first thigh reaction surface 74 and a second thigh reaction surface 76. (The adjectives "first" and "second" are used throughout this document as identifiers and are not intended to signify importance or order.) Each first thigh reaction surface 74 may be positioned above one of the thigh airbags 72 relative to the seat 38 and positioned so that the thigh airbag 72 contacts the first thigh reaction surface 74 when inflating. Each second thigh reaction surface 76 may be positioned outboard the thigh airbags 72 relative to the seat 38 and positioned so that one of the thigh airbags 72 contacts the second thigh reaction surface 76 when inflating. The first thigh reaction surfaces 74 and second thigh reaction surfaces 76 may be elongated generally parallel to the seat bottom 44 in the forward direction relative to the seat 38. When the occupant 99 presses against the thigh airbags 72 during an impact, the thigh reaction surfaces 74, 76 resist the motion of the thigh airbags 72, thus resisting the momentum of the occupant 99.

Figure 8:
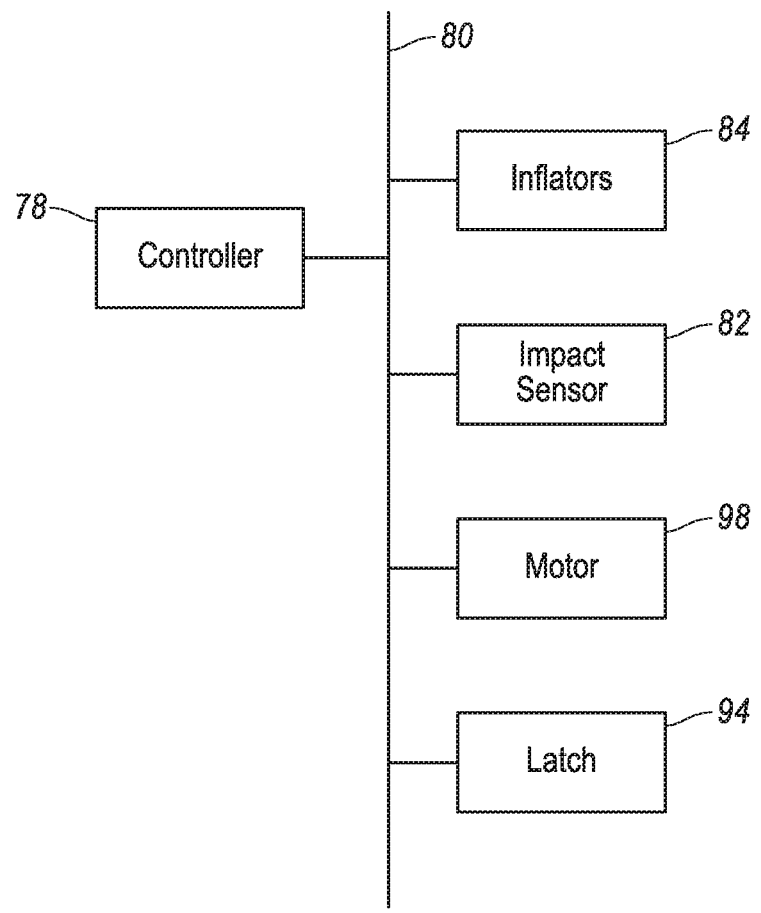
FIG. 8 is a block diagram of a control system for the airbags.

With reference to FIG. 8, the vehicle 30 may include a controller 78. The controller 78 is a microprocessor-based controller. The controller 78 includes a processor, memory, etc. The memory of the controller 78 includes memory for storing instructions executable by the processor as well as for electronically storing data and/or databases. The controller 78 may be the same computer responsible for operating the vehicle 30 autonomously or semi-autonomously, or the controller 78 may be a different computer. Alternatively or additionally, the controller 78 may be a restraint control module.

The controller 78 may transmit signals through a communications network 80 such as a controller area network (CAN) bus, Ethernet, WiFi, Local Interconnect Network (LIN), onboard diagnostics connector (OBD-II), and/or by any other wired or wireless communications network. The controller 78 may be in communication with an impact sensor 82, inflators 84, the motor 98, and the latch 94 via the communications network 80.

The impact sensor 82 is adapted to detect an impact to the vehicle 30. The impact sensor 82 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 82 may be located at numerous points in or on the vehicle 30.

With reference to FIGS. 5 and 8, the inflators 84 may be connected to the upper airbags 60, knee airbags 62, and thigh airbags 72, e.g., one of the inflators 84 with each of the airbags. Upon receiving a signal from, e.g., the controller 78, the inflators 84 may inflate the airbags with an inflatable medium, such as a gas. The inflators 84 may be compressed-gas inflators. Alternatively, the inflators 84 may be, for example, pyrotechnic inflators that use a chemical reaction to drive inflation medium to the airbags. The inflators 84 may be, e.g., cold-gas inflators.

In the event of an impact, the impact sensor 82 may detect the impact and transmit a signal through the communications network 80 to the controller 78. The controller 78 may transmit a signal through the communications network 80 to the motor 98 to slide the arms 52 to the extended position if not already in the extended position. The controller 78 may transmit a signal through the communications network to the latch 94 to latch, if not already latched. The controller 78 may transmit a signal through the communications network 80 to the inflators 84. The inflators 84 may discharge and inflate the upper airbags 60, knee airbags 62, and thigh airbags 72. The upper airbags 60 may resist forward momentum of the occupant 99 relative to the seat 38, specifically of an upper torso and head of the occupant 99. The knee airbags 62 may resist forward momentum of the occupant 99 relative to the seat 38, specifically of legs of the occupant 99. The thigh airbags 72 may reduce the likelihood that the occupant 99 submarines from the seat 38, and the thigh airbags 72 may resist lateral momentum of the occupant 99 relative to the seat 38. The upper airbags 60, knee airbags 62, and thigh airbags 72 may cushion the occupant 99 during the impact regardless of the orientation of the seat 38. After a preset duration, the controller 78 may transmit a signal through the communications network 80 to the latch 94 to unlatch.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat assembly comprising:
   a seat;
   two arms coupled to the seat, each arm movable from a stowed position beside the seat to an extended position abutting the other arm;
   an airbag coupled to each arm and inflatable toward the seat when the arms are in the extended position; and
   reaction surfaces deployable relative to the arm from an undeployed position to a deployed position,
   wherein the airbags in the inflated position contact the reaction surfaces in the deployed position; and
   the reaction surfaces are rotatable relative to the arms between the undeployed position and the deployed position.

2. The vehicle seat assembly of claim 1, wherein each of the airbags is positioned to be between one of the reaction surfaces and the seat when the airbags are in the inflated position.

3. The vehicle seat assembly of claim 1, wherein each reaction surface in the undeployed position covers one of the airbags in an uninflated position.

4. The vehicle seat assembly of claim 1, wherein the airbags are first airbags, the vehicle seat assembly further comprising a second airbag coupled to each arm.

5. The vehicle seat assembly of claim 4, wherein the seat includes a seat bottom and a seatback, wherein the first airbags are inflatable toward the seatback, and the second airbags are inflatable toward the seat bottom.

6. The vehicle seat assembly of claim 5, wherein the reaction surfaces are first reactions surfaces, the vehicle seat assembly further comprising second reaction surfaces positioned on the arms to contact a respective one of the second airbags in an inflated position and positioned with the second airbags between the second reaction surface and the seat bottom when the second airbags are in the inflated position.

7. The vehicle seat assembly of claim 5, wherein the first airbags expand upward relative to the seat when inflating.

8. The vehicle seat assembly of claim 1, wherein the arms are slidable relative to the seat between the stowed position and the extended position.

9. The vehicle seat assembly of claim 8, wherein the arms are curvedly elongated and slidable along a curved path between the stowed position and the extended position.

10. The vehicle seat assembly of claim 1, further comprising two armrests spaced from the arms.

11. The vehicle seat assembly of claim 10, wherein the airbags are first airbags, the vehicle seat assembly further comprising a second airbag coupled to each armrest.

12. The vehicle seat assembly of claim 11, wherein the reaction surfaces are first reactions surfaces, the vehicle seat assembly further comprising second reaction surfaces positioned on the armrests above one of the second airbags relative to the seat, the second reaction surfaces being positioned to contact the second airbags in an inflated position.

13. The vehicle seat assembly of claim 11, wherein the second airbags abut each other when inflated.

14. The vehicle seat assembly of claim 1, wherein the arms are latchable to each other in the extended position.

15. A vehicle seat assembly comprising:
a seat including a seat bottom and a seatback;
two arms coupled to the seat, each arm movable from a stowed position beside the seat to an extended position abutting the other arm;
a first airbag coupled to each arm and inflatable toward the seatback when the arms are in the extended position; and
a second airbag coupled to each arm and inflatable toward the seat bottom when the arms are in the extended position.

16. The vehicle seat assembly of claim 15, further comprising first reaction surfaces positioned on the arms to contact a respective one of the first airbags in an inflated position and positioned with the first airbags between that first reaction surface and the seatback when the first airbags are in the inflated position, and further comprising second reaction surfaces positioned on the arms to contact a respective one of the second airbags in an inflated position and positioned with the second airbags between the second reaction surface and the seat bottom when the second airbags are in the inflated position.

17. The vehicle seat assembly of claim 15, wherein the first airbags expand upward relative to the seat when inflating.

18. A vehicle seat assembly comprising:
a seat;
two arms coupled to the seat, each arm movable from a stowed position beside the seat to an extended position abutting the other arm;
two armrests spaced from the arms;
a first airbag coupled to each arm and inflatable toward the seat when the arms are in the extended position; and
a second airbag coupled to each armrest.

19. The vehicle seat assembly of claim 18, further comprising reaction surfaces positioned on the armrests above one of the second airbags relative to the seat, the reaction surfaces being positioned to contact the second airbags in an inflated position.

20. The vehicle seat assembly of claim 18, wherein the second airbags abut each other when inflated.

* * * * *